(12) United States Patent
Vander Louw et al.

(10) Patent No.: US 6,193,791 B1
(45) Date of Patent: Feb. 27, 2001

(54) POLISH COMPOSITION AND METHOD OF USE

(75) Inventors: Steven J. Vander Louw; Chetan P. Jariwala, both of Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/405,636

(22) Filed: Sep. 24, 1999

(51) Int. Cl.$^7$ ............................. C09G 1/06; C09G 1/08; C09G 1/10; C09G 1/12

(52) U.S. Cl. ............................ 106/3; 106/10; 106/271; 106/287.1; 106/287.13; 106/287.14; 524/62; 524/462; 525/276

(58) Field of Search .................. 106/3, 10, 271; 106/287.1, 287.13, 287.14; 524/62, 462, 276

(56) References Cited

U.S. PATENT DOCUMENTS

| | | | |
|---|---|---|---|
| 2,803,615 | 8/1957 | Ahlbrecht et al. | 260/29.6 |
| 2,803,656 | 8/1957 | Ahlbrecht et al. | 260/556 |
| 2,841,573 | 7/1958 | Ahlbrecht et al. | 260/79.3 |
| 3,758,447 | 9/1973 | Falk et al. | 260/78.5 |
| 3,882,067 | * 5/1975 | Petrella | 524/144 |
| 3,886,201 | 5/1975 | Falk et al. | 260/481 |
| 3,890,271 | 6/1975 | Kokoszka | 260/46.5 |
| 3,960,575 | 6/1976 | Martin | 106/10 |
| 3,965,148 | 6/1976 | Kleiner et al. | 260/481 |
| 4,302,366 | 11/1981 | Perronin et al. | 252/8.57 |
| 5,025,052 | 6/1991 | Crater et al. | 524/104 |
| 5,143,963 | 9/1992 | Sterling et all | 524/366 |
| 5,292,796 | 3/1994 | Dams et al. | 524/598 |
| 5,300,587 | 4/1994 | Mascia et al. | 525/359.3 |
| 5,314,959 | 5/1994 | Rolando et al. | 525/276 |
| 5,336,717 | 8/1994 | Rolando et al. | 525/64 |
| 5,420,015 | 5/1995 | Wuerch | 106/162 |
| 5,451,622 | 9/1995 | Boardman et al. | 524/100 |
| 5,453,540 | 9/1995 | Dams et al. | 564/96 |
| 5,705,592 | 1/1998 | Sejpka et al. | 528/42 |
| 5,782,962 | 7/1998 | Burke et al. | 106/2 |
| 5,962,074 | * 10/1999 | Wollner | 427/322 |

FOREIGN PATENT DOCUMENTS

| | | |
|---|---|---|
| 0 556 770 A1 | 8/1993 | (EP) . |
| 63-054410 | 3/1988 | (JP) . |
| 05306398 | 11/1993 | (JP) . |
| WO 99/05345 | 2/1999 | (WO) . |

OTHER PUBLICATIONS

Davidsohn et al., *Polishes*, C.R.C. Press, Cleveland, OH., pp. 68–73 (1968). (No Month).

Dow Corning's *Automotive Car Formulation Guide*, No. 25–653–94, APF 310. (No Date).

Dow Corning's *Automotive Car Formulation Guide*, No. 25–652–94, APF 210. (No Date).

* cited by examiner

Primary Examiner—Anthony Green
(74) Attorney, Agent, or Firm—Kent S. Kokko

(57) ABSTRACT

A polish composition comprising a base component and a alkylated fluorochemical oligomer. The oligomer comprises a fluorochemical oligomeric portion, an aliphatic moiety, and a linking group which links the two. The base component of the polish composition may be a wax, a silicone oil, or a mixture of the two.

17 Claims, No Drawings

POLISH COMPOSITION AND METHOD OF USE

FIELD OF THE INVENTION

This invention relates to the field of liquid, solid and semisolid polish compositions comprising novel fluorochemicals, specifically compositions capable of imparting durable, high-luster finishes to painted surfaces. These compositions exhibit increased ease of removal and provides a durable finish to surfaces.

BACKGROUND

Car owners have a long-standing desire to provide their automobiles with a beautiful, shiny appearance, and to protect the underlying paint from environmental damage such as mud, water spots, and the effects of the sun. Over the years, car owners have come to prefer paste waxes to protect and beautify the exterior painted surfaces of their vehicles because wax finishes are typically more durable than finishes provided by wax-free products. One reason for their durability is that waxes provide harder coatings than greases or oils. Because of their superior hardness, waxes do not thin out when polished to a high-gloss sheen by rubbing with a polishing cloth.

Coatings based on waxes or silicones rely on the low surface energy to bead the water and protect the surface. Performance life is limited by the durability of the coating. Most of these materials are poly(dimethylsiloxane) fluids and paraffin waxes, are difficult to remove, and have limited durability.

Low surface energy coatings for use as automotive or marine waxes are available. These materials are generally silicones, which are expensive, difficult to apply, and have little durability. Paraffin waxes are also used, but these materials are also difficult to apply and remove from the finished surface of an automobile or boat. High molecular weight silicones were added to paraffin waxes to facilitate removal.

During the 1950's, silicone-polymer-containing liquid emulsions supplanted paste waxes as vehicle polishes in the consumer market because these emulsions are generally easier to apply to a car's finish, contained "built-in" road tar removers, and could be polished with less effort. However, those consumers who are more serious about the appearance of their car's finish (i.e., aficionados), and who restore vintage automobiles, continue to believe that higher gloss and durable finishes can only be achieved with paste waxes. These aficionados, as well as a broader class of specialty auto finish consumers, perceive paste wax finishes as being hard and durable and conversely perceive emulsion based finishes as being soft, and easily removed. Furthermore, the specialty market is concerned with other properties of paste wax, for example the subjective feel or "hand" of wax as it is spread out on a painted surface. If the wax is too soft or contains too much non-volatile solvent, the wax can be "smeary" and slow drying. Conversely, if the wax is too hard, it can be difficult to "rub-out." Thus, there exists a need for a wax composition having desired physical properties including durability, ease of application, and stain resistance.

The addition of fluorochemical additives to automobile/marine compounds, glazes, waxes, and polishes is known. U.S. Pat. No. 5,705,592 (Sejpka et al.) describes a hard surface care material containing solid fluoro-silicone wax which changes the state of aggregation reversibly as result in change in temperature on rubbing giving a water proof, oil proof, and weather resistant surface. U.S. Pat. No. 5,420,015 (Wuerch) describes a non-spotting overspray masking composition for vehicles-includes amount of nonionic fluorochemical surfactant, nonvolatile polyhydroxy component, triethanolamine, and thickener.

SUMMARY OF THE INVENTION

The present invention relates to polish compositions having improved physical and performance properties, including "hand," detergent resistance (durability), "hardness," and "rub-out" properties. The polish composition comprises a base component selected from the group of waxes, silicone oils, an mixtures thereof; and an alkylated fluorochemical oligomer comprising an aliphatic backbone with a plurality of pendent fluoroaliphatic groups and fluorine-free aliphatic pendent groups, each fluoroaliphatic group having a fully fluorinated terminal group and each independently linked to a carbon atom of the aliphatic backbone through an organic linking group; (ii) an aliphatic moiety; and (iii) a linking group which links the fluorochenical oligomeric portion to the aliphatic moiety. Addition of these alkylated fluorochemical oligomers to the polish composition results in a substantial decrease in the effort needed to remove the residue left behind during polishing by these products and a substantial increase in the durability of said formulations.

Yet another aspect the present invention relates to a method of protecting a substrate from sources of environmental damage. The sources of environmental damage can include for example, sunlight, rain and acid rain, water spotting, road tar, tree sap. According to the method a substrate having a surface is coated with a continuous layer of the polish composition. The method comprises the steps of providing a substrate, and coating the substrate with the above-described polish composition. Polishes of this invention may be used on automobiles, recreational vehicles, boats, and other finished surfaces. These coatings provide low surface energies to prevent water from standing on the surface and staining painted surfaces by causing water to bead. The described invention would greatly reduce the effort needed to apply these materials to the previously mentioned surfaces.

The present invention also relates to a polish composition that contains an alkoxylated wax that comprises a wax material such as a natural wax, having poly(alkoxy) groups attached to the wax molecules at one or more of a free alcohol group, a free acid group, or an olefinic group. The alkoxylated wax can preferably be prepared by reacting a wax material with an alkylene oxide, such as by reacting a carnauba wax with ethylene or propylene glycol, to attach poly(alkoxy)groups at free alcohol, free acid, or olefinic group within the carnauba wax. The alkoxylated wax of the present invention provides a wax composition that does not phase separate during processing. The alkoxylated wax acts to compatibilize the wax composition, preventing phase separation of the different ingredients of the wax composition. Because the wax does not phase separate, there is no need for the usual precautions taken during processing to prevent the wax composition from phase separating. For instance, the wax composition can be poured into packaging containers in a single pour instead of filling a container in a series of pouring and cooling steps.

As used herein "polish" refers to a substance that imparts smoothness, surface protection and/or a decorative finish to a substrate. The polish may be in solid, liquid or semisolid form and may be in solution, emulsion, suspension or neat.

As used in the present description, "paste" refers to a substance that is macroscopically solid at room temperature and that readily yields under pressure.

"Substrate" refers to surfaces of motor vehicle (e.g., cars, trucks, snowmobiles, motorcycles, etc.) or boat finishes, that can be made of, for example, fiberglass, plastics, and metals, and that can also be coated with a paint finish.

The term "silicone" as used herein includes polydiorganosiloxanes (and moieties derived therefrom) wherein each organo group is independently selected from the group consisting of alkyl groups (such as C1 to C12 alkyl groups, for example).

The term "solvent" refers to a liquid compound which can dissolve or disperse the components of the polish composition.

DETAILED DESCRIPTION

The polish composition of the present invention comprises a base component and an alkylated fluorochemical oligomer (referred to herein as the "oligomer"). The oligomer comprises
(i) an aliphatic backbone with a plurality of pendent fluoroaliphatic and fluorine-free aliphatic pendent groups, each fluoroaliphatic group having a fully fluorinated terminal group and each of pendent fluoroaliphatic and fluorine-free aliphatic pendent groups independently linked to a carbon atom of the aliphatic backbone through organic linking groups;
(ii) an aliphatic moiety; and
(iii) a linking group which links the fluorochemical oligomeric portion to the aliphatic moiety.

The fluorinated compounds in a composition of the invention generally contain a plurality of fluoroaliphatic groups proximal to one another (e.g., on alternating carbon atoms of an aliphatic backbone, or occasionally on adjacent carbon atoms), as distinct from isolated fluoroaliphatic groups distributed throughout the compound and also as distinct from fluoroaliphatic groups uniformly on adjacent carbon atoms.

In a preferred embodiment, the invention provides fluorochemical compositions comprising fluorinated compounds of Formulas I or II

  I

  II wherein
m is 1 or 2;
n is 1 to 4 inclusive;
each L independently comprises a linking group;
R is a saturated or unsaturated aliphatic moiety of 1 to 75 carbon atoms; and
A is a fluorochemical oligomeric portion of the formula:

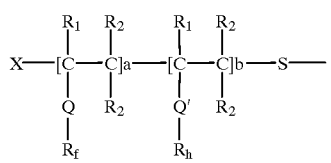  III wherein the sum of a+b is an number such that A is oligomeric and comprises a plurality of pendent $R_f$ and $R_h$ groups; preferably the ratio of a:b is 4:1 or more, and preferably a is 3 to 8 and b is 1 to 3.
$R_1$ is hydrogen, halogen, or straight chain or branched chain alkyl containing 1 to about 4 carbon atoms;
each $R_2$ is independently hydrogen or straight chain or branched chain alkyl containing 1 to about 4 carbon atoms;

each Q is a covalent bond or an organic linking group, such as a sulfonamidoalkylene group;
$R_f$ is a fluoroaliphatic group, such as —$(CF_2)_7CF_3$, that comprises a fully fluorinated terminal group;
$R_h$ is a fluorine-free aliphatic group; and
X is a hydrogen atom or a group derived from a free radical initiator (e.g. t-butoxy).

Preferably, with reference to Formulas I and II, both m and n are one to produce an alkylated fluorochemical oligomer of the Formula IV:

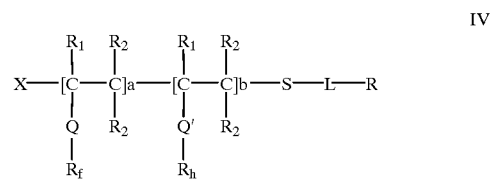  IV

With reference to Formulas III and IV, it will be understood that the oligomer may have a random distribution of fluorinated and fluorine-free segments, or a sequential arrangement where the oligomer comprises "blocks" of fluorinated and fluorine-free segments. Further it will be understood that the relative position of the units derived from fluorinated monomers and fluorine-free monomers may vary with respect to the X and S moieties. In essence the following structures are both within the scope of the invention:

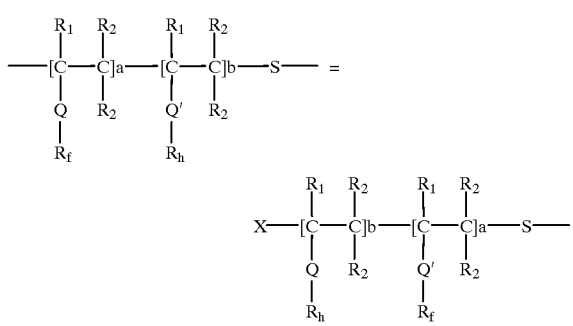

As described above and further illustrated in Formulas I–IV, a fluorochemical composition of the invention comprises a fluorinated compound that generally has three principal portions: a fluorochemical oligomeric portion "A", a linking group "L", and a aliphatic moiety "R". The fluorochemical oligomeric portion and the organic moiety are linked together by linking group L. The linking group may be a covalent bond, an alkylene group, a group that results from a condensation reaction between a nucleophile, such as an alcohol, an amine, or a thiol, and an electrophile such as a carboxylic acid, ester, acyl halide, sulfonate ester, sulfonyl halide, cyanate, isocyanate, or a group that results from a nucleophilic displacement reaction between a nucleophile, such as previously described, and a moiety bearing a leaving group, such as the reaction between an alcohol (or alkoxide) and an alkyl halide (where the halogen atom of the alkyl halide serves as a leaving group).

Examples of suitable linking groups L include a covalent bond, straight chain, branched chain, or cyclic alkylene, arylene, aralkylene, oxy, oxo, hydroxy, thio, sulfonyl, sulfoxy, amino, imino, sulfonamido, carboxamido, carbonyloxy, urethanylene, ureylene, and combinations thereof such as sulfonamidoalkylene.

A salient component of the fluorochemical oligomeric portion is the fluoroaliphatic group, designated herein as $R_f$.

The fluorinated compound of the invention contains a plurality of pendent $R_f$ groups (e.g., from 2 to about 10) proximal to one another and preferably contains from about 5 percent to about 80 percent, more preferably from about 10 percent to about 65 percent, and most preferably about 12 percent to about 60 percent fluorine by weight based on the total weight of the compound, the loci of the fluorine being essentially in the $R_f$ groups. $R_f$ is a stable, inert, non-polar, preferably saturated, monovalent moiety which is both oleophobic and hydrophobic. $R_f$ preferably contains at least about 3 carbon atoms, more preferably 3 to about 20 carbon atoms, and most preferably about 4 to about 14 carbon atoms. $R_f$ can contain straight chain, branched chain, or cyclic fluorinated alkylene groups or combinations thereof or combinations thereof with straight chain, branched chain, or cyclic alkylene groups. $R_f$ is preferably free of polymerizable olefinic unsaturation and can optionally contain catenary heteroatoms such as divalent oxygen, or trivalent nitrogen. It is preferred that $R_f$ contain about 40% to about 78% fluorine by weight, more preferably about 50% to about 78% fluorine by weight. The terminal portion of the $R_f$ group contains a fully fluorinated terminal group. This terminal group preferably contains at least 7 fluorine atoms, e.g., $CF_3CF_2CF_2—$, $(CF_3)_2CF—$, or the like. Perfluorinated aliphatic groups (i.e., those of the formula $C_oF_{2o+1}$, where o is 4 to 14 are the most preferred embodiments $R_f$.

The fluorine-free aliphatic moiety, designated $R_h$ in compounds of Formulas I–IV is a monovalent, linear or branched chain, saturated or unsaturated, cyclic or acyclic (or any combination thereof) organic aliphatic group having from 1 to 75 carbon atoms. Although not preferred, $R_h$ may contain aromatic rings. $R_h$ may contain caternary oxygen atoms. The range of structures contemplated for the organic moiety $R_h$ will be better understood with reference to the compounds suitable for use in steps of the Reaction Schemes described in detail below. Preferably $R_h$ is a linear, monovalent alkyl group having from 1 to 75 carbon atoms, preferably 1 to 18 carbon atoms. Where more than one $R_h$ group is present, such as in Formula II, or when n is greater than one in Formula I, the sum of the carbon atoms in the $R_h$ groups is preferably 100 carbon atoms or fewer.

The organic aliphatic moiety, designated R in compounds of Formulas I–IV is a mono-, di-, tri- or tetravalent, linear or branched chain, saturated or unsaturated, cyclic or acyclic (or any combination thereof organic aliphatic group having from 1 to 75 carbon atoms. Although not preferred, R may contain aromatic rings and may be fluorinated (i.e $R=R_f$). R may contain caternary oxygen atoms. The valency is equivalent to the value of n in Formula I and is equal to 1 in Formula II. The range of structures contemplated for the organic moiety R will be better understood with reference to the compounds suitable for use in steps of the Reaction Schemes described in detail below. Preferably R is a linear, monovalent alkyl group having from 1 to 75 carbon atoms. Where more than one R group is present, such as in Formula II, or when n is greater than one in Formula I, the sum of the carbon atoms in the R groups is preferably 100 carbon atoms or fewer.

The aliphatic backbone of the fluorochemical oligomeric portion comprises a sufficient number of polymerized units to render the portion oligomeric. The aliphatic backbone preferably comprises from 2 to about 10 polymerized units ("a" and "b" in Formulas III and IV) derived from fluorinated monomers (i.e., monomers containing a fluorinated organic group $R_f$ and the fluorine-free aliphatic group as defined above), it is more preferred that the aliphatic backbone comprise from 3 to about 8, most preferably about 4, polymerized units. It is preferred that the ratio of "a" to "b" is 4:1 or more.

The fluorochemical compositions of the invention generally comprise mixtures of compounds. Accordingly, compounds are sometimes referred to herein as having non-integral numbers of particular substituents (e.g., "a=2.7"). In such cases the number indicates an average and is not intended to denote fractional incorporation of a substituent. The terms "oligomer" or "oligomeric" when used herein designate compounds containing a plurality of polymerized units, but fewer than that number of polymerized units present in a polymer (e.g., chains of 2 to about 20 oligomerized units are to be considered "oligomeric").

The fluorochemical group $R_f$ is linked to the organic portion (i.e. the oligomeric backbone or the unsaturated portion of the monomer) by a linking group designated as Q and Q' in the formulas used herein. Q and Q' are independently linking groups that may be a covalent bond, divalent alkylene, or a group that can result from the condensation reaction of a nucleophile such as an alcohol, an amine, or a thiol with and electrophile, such as an ester, acid halide, isocyanate, sulfonayl halide, sulfonyl ester, or may result from a displacement reaction between a nucleophile and leaving group. Each Q is independently chosen, preferably contains from 1 to about 20 carbon atoms and can optionally contain catenary oxygen, nitrogen, sulfur, or silicon-containing groups or a combination thereof Q is preferably free of functional groups that substantially interfere with free-radical oligomerization (e.g., polymerizable olefinic double bonds, thiols, easily abstracted hydrogen atoms such as cumyl hydrogens, and other such functionality known to those skilled in the art). Examples of structure suitable for linking group Q include straight chain, branched chain, or cyclic alkylene, arylene, aralkylene, oxy, oxo, hydroxy, thio, sulfonyl, sulfoxy, amino, imino, sulfonamido, carboxamido, carbonyloxy, urethanylene, ureylene, and combinations thereof such as sulfonamidoalkylene. Preferably linking group Q is a covalent bond or a sulfonamidoalkylene group. Preferably Q' is a covalent bond.

Suitable linking groups Q and Q' include the following structures in addition to a covalent bond. For the purposes of this list, each k is independently an integer from 0 to about 20, $R_1'$ is hydrogen, phenyl, or alkyl of 1 to about 4 carbon atoms, and $R_2'$ is alkyl of 1 to about 20 carbon atoms. Each structure is non-directional, i.e. $—(CH_2)_kC(O)O—$ is equivalent to $—O(O)C(CH_2)_k—$.

| | |
|---|---|
| $—SO_2NR_1'(CH_2)_kO(O)C—$ | $—CONR_1'(CH_2)_kO(O)C—$ |
| $—(CH_2)_kO(O)C—$ | $—CH_2CH(OR_2')CH_2O(O)C—$ |
| $—(CH_2)_kC(O)O—$ | $—(CH_2)_kSC(O)—$ |
| $—(CH_2)_kO(CH_2)_kO(O)C—$ | $—(CH_2)_kS(CH_2)_kO(O)C—$ |
| $—(CH_2)_kSO_2(CH_2)_kO(O)C—$ | $—(CH_2)_kS(CH_2)_kOC(O)—$ |
| $—(CH_2)_kSO_2NR_1'(CH_2)_kO(O)C—$ | $—(CH_2)_kSO_2—$ |
| $—SO_2NR_1'(CH_2)_kO—$ | $—SO_2NR_1'(CH_2)_k—$ |
| $—(CH_2)_kO(CH_2)_kC(O)O—$ | $—(CH_2)_kSO_2NR_1'(CH_2)_kC(O)O—$ |
| $—(CH_2)_kSO_2(CH_2)_kC(O)O—$ | $—CONR_1'(CH_2)_kC(O)O—$ |
| $—(CH_2)_kS(CH_2)_kC(O)O—$ | $—CH_2CH(OR_2')CH_2C(O)O—$ |
| $—SO_2NR_1'(CH_2)_kC(O)O—$ | $—(CH_2)_kO—$ |
| $—(CH_2)_kNR_1'C(O)O—$ | $—OC(O)NR_1'(CH_2)_k—$ |

The fluorinated compounds and fluorochemical compositions of the invention will be illustrated with reference to the embodiments shown in Formulas I–IV. In such embodiments, linking group L links the fluorochemical oligomeric portion A to the aliphatic group R. Each linking group L may be a covalent bond, a di- or polyvalent alkylene, or a group that can result from the condensation reaction of a nucleophile such as an alcohol, an amine, or a thiol with and electrophile, such as an ester, acid halide, isocyanate, sulfonayl halide, sulfonyl ester, or may result from a diplacement reaction between a nucleophile and leaving group. Each L is independently chosen, preferably contains from 1 to about 20 carbon atoms and can optionally contain catenary oxygen, nitrogen, sulfur, or silicon-containing groups or a combination thereof L is preferably free of functional groups that substantially interfere with free-radical oligomerization (e.g., polymerizable olefinic double bonds, thiols, easily abstracted hydrogen atoms such as cumyl hydrogens, and other such functionality known to those skilled in the art). Examples of structure suitable for linking group L include straight chain, branched chain, or cyclic alkylene, arylene, aralkylene, oxy, oxo, sulfonyl, sulfoxy, amino, imino, sulfonamido, carboxamido, carbonyloxy, urethanylene, ureylene, and combinations thereof such as sulfonamidoalkylene. Preferred L groups include a covalent bond and the following structures (and combinations and multiples of such structures) wherein each k is independently an integer from 0 to about 20, $R_1'$ is hydrogen, phenyl, or alkyl of 1 to about 4 carbon atoms, and $R_2'$ is alkyl of 1 to about 20 carbon atoms.

| | |
|---|---|
| —$(CH_2)_kO(O)C$— | —$CH_2CH(OR_2')CH_2C(O)O$— |
| —$(CH_2)_kC(O)O$— | —$(CH_2)_kO$— |
| —$(CH_2)_kO(CH_2)_kO(O)C$— and | —$(CH2)_kOCONH$— |

Returning to Formulas I–IV above, $R_1$ is hydrogen, halogen (e.g., fluoro, chloro, bromo), or straight chain or branched chain alkyl of 1 to about 4 carbon atoms (e.g., methyl, ethyl, propyl, isopropyl, butyl, isobutyl, and the like). Each $R_2$ is independently hydrogen or straight chain or branched chain alkyl of 1 to about 4 carbon atoms.

X is a group derived from a free-radical initiator. As used herein, the term "free-radical initiator" designates any of the conventional compounds such as organic azo compounds, organic peroxides (e.g., diacyl peroxides, peroxyesters, dialkyl peroxides) and the like that provide initiating radicals upon homolysis. As used herein, the term "group derived from a free-radical initiator" designates an initiating radical formed upon homolytic decomposition of a free-radical initiator.

Suitable groups X include non-reactive groups such as a hydrogen atom, t-butoxy (derived from di-t-butylperoxide), and benzoyloxy (derived from benzoyl peroxide), and reactive groups such as —$CCH_3(CN)CH_2CH_2CO_2H$ (derived from azo-4-cyanoisovaleric acid), —$C(CH_3)_2CN$ (derived from azoisobutyronitrile), and those derived from other known functional azo compounds such as 2,2'-azobis[N-(4-chlorophenyl)-2-methylpropionamidine]-dihydrochloride; 2,2'-azobis[N-(4-hydroxyphenyl)-2-methylpropionamidine] dihydrochloride; 2,2,-azobis[N-(4-aminophenyl)-2-methylpropionamidine]-tetrahydrochloride; 2,2'-azobis[2-methyl-N-2-propenylpropionamidine]dihydrochloride; 2,2'-azobis[N-(2-hydroxyethyl)-2-methylpropionamidine]-dihydrochloride; 2,2'-azobis[2-methyl-N-(2-hydroxyethyl)-propionamide]; 2,2'-azobis[2-(hydroxymethyl) propionitrile]; 2,2'-azobis[2-methyl-N-[ 1,1-bis(hydroxymethyl)-2-hydroxyethyl]propionamide]; and 2,2'-azobis{2-methyl-N-[1,1-bis(hydroxymethyl)ethyl]-propionamide}. Preferred groups X include those enumerated above.

The fluorochemical compounds of Formulas I, II and IV can be prepared by oligomerization of an unsaturated, fluorinated compound (IV) in the presence of a free-radical initator and chain-transfer agent of the formula $L(SH)_m$ (where m=1–2) according to the following Scheme:

Scheme 1

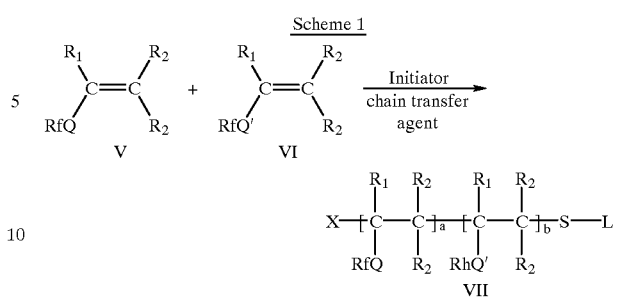

The moiety "L" corresponds to the linking group moiety L of Formula I, II and IV.

When the chain-transfer agent contains more than one sulfhydryl group (i.e. m=2), multiple fluorochemical oligomeric groups A may be linked through linking group L to one or more aliphatic R groups. For examples, when the clain transfer agent contains two sulfhydryl groups, two fluoroaliphatic groups A may be linked to L as follows:

Scheme 2

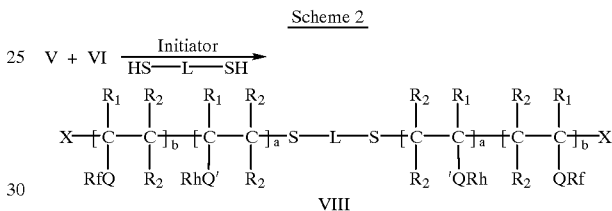

Compounds of Formula (V) and methods for the preparation thereof are known and disclosed, e.g., in U.S. Pat. Nos. 2,803,615 (Ahlbrecht et al.) and U.S. Pat. No. 2,841, 573 (Ahlbrecht et al.) which disclosures are incorporated herein by reference. Examples of such compounds include general classes of fluorochemical olefins such as acrylates, methacrylates, vinyl ethers, and allyl compounds containing fluorinated sulfonamido groups, acrylates or methacrylates derived from fluorochemical telomer alcohols, fluorochemical thiols, and the like. Preferred compounds of Formula V include such as N-methyl perfluorooctanesulfonamidoethyl acrylate, N-methyl perfluorooctanesulfonamidoethyl methacrylate, N-ethyl perfluorooctanesulfonamidoethyl acrylate, N-methylperfluorohexylsulfonamidoethyl acrylate, the reaction product of isocyanatoethyl methacrylate and N-methylperfluorooctanesulfonamidoethyl alcohol, perfluorooctyl acrylate, N-methyl perfluorooctanesulfonamidoethyl vinyl ether, and $C_8F_{17}SO_2NHCH_2CH=CH_2$, and others such as perfluorocyclohexyl acrylate, and tetrameric hexafluoropropyleneoxide dihydroacrylate.

Compounds of Formula VI are selected from alkyl acrylate esters, vinyl acetate, styrene, alkyl vinyl ethers, alkyl methacrylates, acrylic acid, methacrylic acid, acrylamide, methacrylamide, acrylonitrile, methacrylonitrile, and N-vinylpyrrolidone. Alkyl acrylate ester monomers useful in the invention include straight-chain, cyclic, and branched-chain isomers of alkyl esters containing $C_1$–$C_{50}$ alkyl groups. Useful specific examples of alkyl acrylate esters include: methyl acrylate, ethyl acrylate, n-propyl acrylate, 2-butyl acrylate, iso-amyl acrylate, n-hexyl acrylate, heptyl acrylate, n-octyl acrylate, iso-octyl acrylate, 2-ethylhexyl acrylate, nonyl acrylate, decyl acrylate, undecyl acrylate, dodecyl acrylate, tridecyl acrylate, and tetradecyl acrylate. Due to performance considerations, preferred alkyl acrylate esters are those having from $C_1$–$C_{18}$ alkyl groups.

When the chain transfer agent L(SH)$_m$ bears a functional group, a compound of Formula VI (Scheme I) is further reacted with a functional aliphatic compound to form the linking group L and incorporate the R group into the compounds of Formulas I, II and IV. The nature of the functional groups on both the chain transfer agent and the aliphatic compounds are chosen so that they are reactive toward one another to form the L linking group. Examples of mutually reactive pairs include an acyl group (such as a carboxylic acid, acyl halide or ester) reacting with an alcohol or amine, an alcohol or an amine reacting with a "leaving group" such as a halide or tosylate, and an isocyanate reacting with an alcohol or amine.

A compound of Formulas VI or VII can be provided functional groups on the L linking group (in addition to the sulfhydryl group(s)) through the use of an appropriate functionalized chain-transfer agent L(SH)$_m$, wherein L contains a functional group. Suitable functional groups for inclusion in the chain-transfer agent include hydroxy, amino, halo, epoxy, haloformyl, aziridinyl, acid groups and salts thereof which react with an electrophile or nucleophile, or are capable of further transformation into such groups. The use of a functionalized chain-transfer agent allows for subsequent incorporation of the "R" group of Formulas I and II. For example, the "L" group of the chain transfer agent may be substituted with an electrophilic ester moiety. This ester moiety will allow incorporation of a long chain "R" group by further reaction with an aliphatic alcohol having a nucleophilic hydroxyl group. Reaction between the two moieties produces an ester linkage, thereby linking the fluoroaliphatic moiety A with the aliphatic moiety R. Alternatively, for example, the L moiety may be substituted with a hydroxyl group which may be reacted with an aliphatic ester to link the fluoroaliphatic moiety A with the aliphatic moiety R.

Examples of such functional chain transfer agents include 2-mercaptoethanol, mercaptoacetic acid, 2-mercaptobenzimidazole, 2-mercaptobenzoic acid, 2-mercaptobenzothiazole, 2-mercaptobenzoxazole, 3-mercapto-2-butanol, 2-mercaptosulfonic acid, 2-mercaptonicotinic acid, 4-hydroxythiopheno3-mercapto-1,2-propanediol, 1-mercapto-2-propanol, 2-mercaptopropionic acid, N-(2-mercaptopropionyl) glycine, 3-mercaptopropyltrimethoxysilane, 2-mercaptopyridine, 2-mercaptopyridine-N-oxide, 2-mercaptopyridinol, mercaptosuccinic acid, 2,3-mercaptopropanesulfonic acid, 2,3-dimercaptopropanol, 2,3-dimercaptosuccinic acid, cysteine, cysteine hydrochloride, cystsine ethyl ester. Preferred functionalized end-capping agents include 2-mercaptoethanol, 3-mercapto-1,2-propanediol, 4-mercaptobutanol, 11-mercaptoundecanol, mercaptoacetic acid, 3-mercaptopropionic acid, 12-mercaptododecanoic acid, 2-mercaptoethylamine, 1-chloro-6-mercapto-4-oxahexan-2-ol, 2,3-dimercaptosuccinic acid, 2,3-dimercaptopropanol, 3-mercaptopropyltrimethoxysilane, 2-chloroethanethiol, 2-amino-3-mercaptopropionic acid, and compounds such as the adduct of 2-mercaptoethylamine and caprolactam.

Advantageously, the R group of Formulas I, II and IV may be incorporated by use of a non-functional chain transfer agents. Non-functionalized chain-transfer agents are those that contain a group capable of terminating a radical chain reaction (e.g., a sulhydryl) but no further functional groups capable of reacting with nucleophiles, electrophiles, or capable of undergoing displacement reactions. In such cases, the aliphatic portion of L(SH)$_n$ provides the aliphatic group R of Formulas I and II. Such compounds include mono- and dithiols such as ethanethiol, propanethiol, butanethiol, hexanethiol, n-octylthiol, t-dodecylthiol, 2-mercaptoethyl ether, 2-mercaptoimidazole, 2-mercaptoethylsulfide, 2-mercaptoimidazole, 8-mercaptomenthone, 2,5-dimercapto-1,3,4-thiadiazole, 3,4-toluenedithiol, o-, m-, and p-thiocresol, ethylcyclohexanedithiol, p-menthane-2,9-dithiol, 1,2-ethanedithiol, 2-mercaptopyrimidine, and the like.

Whether functionalized or not, a chain transfer agent is present in an amount sufficient to control the number of polymerized monomer units in the oligomer. The chain transfer agent is generally used in an amount of about 0.05 to about 0.5 equivalents, preferably about 0.20 equivalents, per equivalent of olefinic monomer IV.

Also present in oligomerization process is a free-radical initiator as defined above in connection with X. Such compounds are known to those skilled in the art and include persulfates, azo compounds such as azoisobutyronitrile and azo-2-cyanovaleric acid and the like, hydroperoxides such as cumene, t-butyl, and t-amyl hydroperoxide, dialkyl peroxides such as di-t-butyl and dicumyl peroxide, peroxyesters such as t-butyl perbenzoate and di-t-butylperoxy phthalate, diacylperoxides such as benzoyl peroxide and lauroyl peroxide.

The initiating radical formed by an initiator can be incorporated into the fluorochemical oligomer to varying degrees depending on the type and amount of initiator used. A suitable amount of initiator depends on the particular initiator and other reactants being used. About 0.1 percent to about 5 percent, preferably about 0.1 percent, to about 0.8 percent, and most preferably about 0.2 percent by weight of an initiator can be used, based on the total weight of all other reactants in the reaction.

The oligomerization reaction of Schemes 1 and 2 can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and allcyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methylethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREONT™, trichloroethylene, α,α,α-trifluorotoluene, fluorinated ethers such as $C_4F_9OCH_3$ and the like, and mixtures thereof.

The oligomerization can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30 deg. C. and about 200 deg. C.

The oligomer, with its different pendent groups, performs several functions within the polish composition. The aliphatic group allows the oligomer to be compatible with other components of the polish composition, for example with other components that are organic or aliphatic in nature, including the wax component. The aliphatic group also provides adhesion between the oligomer and a substrate. Chemical interaction (e.g., hydrogen bonding) between the aliphatic group and a substrate provides adhesion of the oligomer to the substrate. The improved adhesion between the oligomer and the substrate provides a polish composition having useful durability properties, for instance improved resistance to detergents and mechanical wear. The pendent fluorinated group imparts desired stain resistance, soil resistance and repellency properties to the polish composition of the present invention. More specifically, the pendent fluorinated group provides the polish composition with water and oil repellency.

The pendent aliphatic and fluorinated groups of the oligomer work together to provide a polish coating having desired adhesion, and desired oil, water, and stain repelling properties. While wishing not to be bound by theory, the pendent fluorinated groups are thought to "bloom" to the surface of a coating of the polish composition. At the surface of the coating, the fluorinated groups are able to exhibit their maximum effectiveness in repelling water. Migration of the fluorinated groups to the surface of the coating coincidentally results in a stratification of the coating, causing an increased concentration of the aliphatic groups below the surface of the coating, i.e. in the wax or silicone base. This means that while the fluorinated groups are concentrated at the surface of the coating where they are most effective in repelling water, the aliphatic groups are positioned below the coating surface, where these groups can most effectively promote adhesion between the coating and the substrate. Thus, each of the aliphatic and fluorinated groups of the oligomer are believed to become situated within the coating in positions that allow each group to most effectively enhance the adhesion and water repelling properties of the wax coating.

The oligomer can be present in the polish composition of the present invention in any amount that provides useful water repellency, stain resistance, durability properties, etc. Preferred amounts of oligomer in the polish composition have been found to be in the range from about 1 to 15 parts by weight oligomer, preferably 1 to 5 parts by weight, based on 100 parts by weight of the wax composition (as used herein, the phrase "polish composition" stated in terms of parts by weight of materials therein refers to the base component(s), plus any solvent).

When the base component is a wax, the wax component of the composition can generally be any of various natural or synthetic, viscous or solid heat-sensitive substances, consisting essentially of high molecular weight hydrocarbons or esters of fatty acids, and being characteristically insoluble in water, but soluble in most organic solvents. The wax component provides desired hardness, rub-out, and hand properties to the wax composition, and allows the wax composition to "bind" a solvent, i.e. solvent is bound or trapped within the wax phase, permitting rub-out that yields a high gloss, streak and smear free finish. Any of the wax materials known in the wax art can be used, and preferably the wax composition contains a blend of two or more waxes. Waxes that have been found to be useful include, synthetic waxes, natural waxes such as animal and vegetable waxes, mineral waxes, and micro-crystallized, oxidized, or chemically modified derivatives thereof Examples of animal waxes include spermaceti, beeswax, wool, Chinese insect wax, and shellac wax. Examples of vegetable waxes include carnauba, candelilla, palm, bayberry, jojoba, sugar cane wax, rice-bran, flax, peat, Japan, ouricury, and ceresine. Examples of synthetic waxes include ethylenic polymers, polyether esters, and chlorinated naphthalenes, etc. Examples of mineral waxes include paraffin; polyethylene, montan, ozocerite, petrolatum, etc. Paraffin waxes are derived from straight-chain hydrocarbons with 26–30 carbon atoms per molecule. Microcrystalline waxes are derived from branched-chain hydrocarbons having 41–50 carbon atoms per molecule. Montan waxes are preferred in practicing the invention. An especially preferred montan wax is LP Wax available from American Hoechst Corp., Industrial Chemicals Division.

One preferred wax is natural carnauba wax, which can comprise a mixture of esters of $C_{24}$ and $C_{28}$ normal fatty acids; $C_{32}$ and $C_{34}$ n-alcohols; $\omega$-hydroxy acids, $HO(CH_2)_xCOOH$, where x is 17–29; and smaller amounts of esterified $\alpha,\omega$-diols, $HO(CH_2)_yOH$, where y is 22 to above 28 (see Noller, *Chemistry of Organic Compounds* p. 206 (Third ed. 1966)). Natural carnauba wax is further known to contain amounts of cinnamic aliphatic diester, lactides, and hydrocarbons (see Kirk-Othmer Encyclopedia of Chemical Technology, Volume 24, page 469, (Third ed., 1985)).

Selected waxes can be alkoxylated by reaction of free alcohols, olefinic groups, and acids contained therein with alkoxylating agents such as alkylene oxides (e.g., ethylene oxide, propylene oxide, etc., or combinations thereof), to produce a wax that comprises polymerized alkoxy groups attached to molecules of the wax. Alkoxylation of wax molecules occurs through ring-opening polymerization reactions that are well known in the polymer art. For example, the chemistry and mechanisms of ring-opening polymerization are discussed in detail in *Ring-Opening Polymerization* (Volumes 1, 2 & 3) edited by K. J. Ivin and T. Saegusa, 1984, and more generally in M. P. Stevens, *POLYMER CHEMISTRY: AN INTRODUCTION* pp. 346–351, 360–368 (Second ed., 1990). The kinetics of ring-opening polymerization chemical reactions are described in G. G. Odian, *Principles of Polmerization* pp. 535–558 (Third ed., 1991). The alkylene oxide compound chosen to be reacted onto the wax, as well as the chain length of the resulting poly(alkoxy) groups, can be chosen to provide desirable properties for the wax composition (e.g., for rub-out, hand, softness, etc.).

Natural carnauba wax can be alkoxylated by reacting the free alcohol group, the acid group, or the olefinic group of the cinnamic aliphatic diester with alkylene oxide. Some of the crystalline esters (comprising the major component of carnauba wax) can also be cleaved during the reaction and the resulting acids and alcohols also react with alkylene oxide during the alkoxylation process, increasing the yield of alkoxy adducts. The free acids, alcohols, olefinic groups, and that fraction of the esters that are cleaved can be referred to as "ring-opening initiating groups". A portion of the alkylene oxides can also be hydrolyzed to the corresponding glycols which then react with additional alkylene oxide to form a minor amount of water extractable polyalkylene glycol oligomer.

As an example of the production of an alkoxylated wax, natural carnauba wax (100 parts by weight) can be reacted with about 25 parts by weight of a mixture of ethylene oxide (EO) and propylene oxide (PO) (preferably in a weight ratio in the range from 90:10 to 99:1, for example about 95:05) to attach a poly(alkoxy) group at ring-opening initiating groups. Preferably the resulting poly(alkoxy) group can be comprised of an average of about eleven EO/PO polymerized monomeric units. EO/PO modified carnauba wax of this type is commercially available from Koster Keunen, Inc., of Watertown, Conn.

Alkoxylated carnauba wax is a preferred wax component because alkoxylated carnauba wax has been found to be softer than natural carnauba wax and provides an improved "feel" or "hand" to a wax composition, and also because an alkoxylated carnauba wax provides desired phase stability to a wax composition. The improved phase stability provides an advantage in processing the wax composition. Because these wax compositions will not phase separate when in a liquid state, precautions of preventing phase separation of the liquid wax composition are not required. As a result the wax composition comprising alkoxylated carnauba wax can be poured into a packaging container in a single step without waiting for the composition to cool and solidify, and the composition will not phase separate.

Silicone oils may also be used as the base component of the polish. Useful silicone oils include those dialkyl polysiloxanes having an effective dynamic viscosity range of from 50 to 10,000 cps. As noted in Davidsohn and Mildowsky, *Polishes*, C.R.C Press, Cleveland, Ohio, 1968, pp. 68–73, a silicone oil may constitute the major or minor component of a base material for polishes. Where it is used as the major component, the silicone oil improves lubricity, ease of buffing, and serves as a release agent for dried abrasives. Silicone oils spread easily, provide uniform high gloss and good water repellency. Minor amounts of waxes may be added to the silicone oils to improve polishing of rough or scratched finishes, to reduce water spotting, or to reduce the overall cost of the formulation. When silicone oils are uses as a minor component, it is used to provide ease of application and greater depth of gloss.

A useful class of silicone oils includes dialkyl polysiloxanes of the formula:

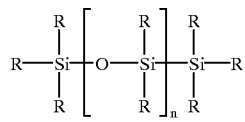

Where each R is independently chosen from alkyl or aryl groups. Preferably R is methyl to produce dimethyl polysiloxanes. Useful silicone oils also include hydroxy- or amino-terminated dialkyl polysiloxanes such as those taught in U.S. Pat. No. 3,890,271 (Kokoszka) and U.S. Pat. No. 3,960,575 (Martin), the disclosures of which are herein incorporated by reference.

The base component (i.e. the wax or silicone oil) can be present in the polish composition in any amount that will provide desired hardness, rub-out, and hand properties. Preferred amounts of base component have been found to be in the range from about 5 to 42 parts by weight base component based on 100 parts polish composition. If the base component is a wax, it can contain any amount (i.e., from 0 to 100 parts by weight) of alkoxylated wax, but it is preferred that from about 30 to 90 percent by weight of the wax component is an alkoxylated wax such as the above-described EO/PO modified carnauba wax.

The polish composition of the present invention can also contain a solvent which can soften the composition to form a readily applicable paste having a desired feel or "hand," and that can be easily spread onto a substrate. Some types of hydrocarbon solvents can also aid in dissolving and removing small amounts of road tar and greasy residues from the vehicle surface as the wax composition is applied, thereby acting as a cleaner. After application to a substrate, the solvent component of the polish composition evaporates to leave the remaining components of the polish composition, including the base component and the oligomer. Suitable solvents include aliphatic hydrocarbon liquids such as mineral spirits, naphtha, Stoddard solvent, kerosene, and dipentene; cycloaliphatic hydrocarbons; aromatic hydrocarbons such as naphtha or small amounts of toluene or xylene; and terpenes such as pine oil and turpentine. When the base component is a silicone oil, the preferred solvent is water.

The solvent can be present in the wax composition in any amount that will provide a useful balance of the above-described properties. Sufficient solvent should be present to allow enough time after application to fully rub-out the composition before it dries. However, if too much solvent is used, the wax composition tend to become smeary, and if to little solvent is present, the wax composition can become too hard. Preferred amounts of solvent have been found to be in the range from about 40 to 80 parts by weight solvent based on 100 parts by weight of the polish composition.

When the base component is a wax, silicone fluids are preferably added to the polish composition to aid rub-out by acting as a lubricant. Specific examples of silicone fluids include polydimethylsiloxane (PDMS), preferably having a kinematic viscosity in the range from about 50 to 100,000 centistoke ($mm^2/sec$), more preferably from 100 to 30,000 centistoke, and most preferably about 350 centistoke. Preferred amounts of silicone fluid have been found to be in the range from about 4 to 13 parts by weight silicone fluid based on 100 parts by weight of the wax base component. Reactive silicone fluids such as Dow Corning 531 and 536 are aminofunctional polydimethylsiloxane copolymers that impart additional performance advantages in the form of increased detergent resistance, increased durability, and high gloss. These materials are available from Dow Corning of Midland, Mich.

The wax composition of the present invention may also contain other ingredients known to be useful in the production of wax compositions, including fragrances, water beading additives, pigments, mild abrasives, dyes, ultraviolet stabilizers, antioxidants, water, surfactants, thickeners, and preservatives.

For some applications, small amounts of micro-abrasives may be added to the compositions to aid in removal of thin damaged layers in the paint finish, for example when the finish is severely hazy or otherwise damaged by exposure to solar radiation. Examples of suitable mild abrasives include diatomaceous earth, alumina, aluminum silicate, various clays, amorphous silica, crystalline silica, pumice, garnet, and microcrystalline silica. Kaopolite SF is a specific grade of clay abrasive from Kaopolite, Inc. of Union, N.J.

Preferred embodiments of the invention can contain fragrances that mask the residual odor of hydrocarbon solvents.

Thickeners are compounds that allow for the control of flow properties of coatings. In a typical coating, they protect the dispersed pigments (of any) and prevent or control pigment settling while producing thixotropic viscosity build and sag control. Bentone 38 is a organophillic clay produced by Rheox, Inc. of Highstown, N.J.

Water bead enhancers can be added to the wax compositions to control the appearance and size of water beads on freshly waxed surfaces. Water bead enhancers that have been found to be useful include blends of polyethylene waxes and micronized poly(tetrafluoroethylene) such as, Aquabead 519, available from Micro Powders Inc., Tarrytown, N.Y.

The above ingredients can be combined to produce the wax composition of the present invention by well known methods. In general, the solvent component is heated to a temperature sufficient to melt the wax component. The wax component is then dispersed into the solvent. Once the wax component is dispersed in the solvent, there is no fuirther need to heat the composition. The temperature of the composition can be reduced to a temperature in the range from about 65 to 70° C., and the remaining ingredients, including the oligomer, can then be mixed into the solvent/wax dispersion. The completed wax composition can then be reduced to a temperature that will allow pouring of the wax composition without coagulation, (e.g., about 65° C.) and poured into a packaging container.

In a preferred embodiment of the present invention, comprising the above-described alkoxylated carnauba wax, the wax composition does not phase separate at elevated temperatures. Thus, the heated processing steps can be undertaken without taking precautions to prevent phase separation of the composition while the composition is in its liquid state. For example, there is no need to pour the liquid composition into a packaging container in multiple steps.

The invention will now be described by the following non-limiting examples.

EXAMPLES

Glossary

AIBN—2,2'-azobisisobutyronitrile, available as VAZO™ 64 initiator from E. I. duPont de Nemours & Co., Wilmington, Del.

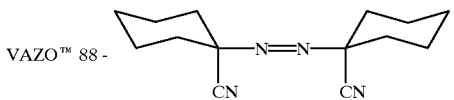

VAZO™ 88 initiator, available from E. I. duPont de Nemours & Co.

TELOMER-A—FLUOWET™ AC-812 fluoroacrylate monomer, $(CH_2=CHC(O)OCH_2CH_2(CF_2)_nCF_3$, where n is a value ranging from about 3 to 11 and averaging about 7, available from Hoechst Aktiengesellschaft, Frankfurt Am Main, Germany).

MeFBSEA—$C_4F_9SO_2N(CH_3)CH_2CH_2OC(O)CH=CH_2$, can be prepared using the general procedure described in U.S. Pat. No. 2,803,615.

MeFOSEA—$C_8F_{17}SO_2N(CH_3)C_2HOC(O)CH=CH_2$, can be prepared using the general procedure described in U.S. Pat, No. 2,803,615.

MeFOSEMA—$C_8F_{17}SO_2N(CH_3)C_2HOC(O)C(CH_3)=CH_2$, can be prepared by the general procedure described in U.S. Pat. No. 2,803,615.

UNILIN™ 700—(also known as polyethylene 700 alcohol from Aldrich Chemical), having about 50 carbon atoms, available from Baker Petrolite Corp., Tulsa, Okla.

UNILIN™ 700A—To a three necked round bottom flask equipped with a mechanical stirrer and a Dean-Stark apparatus was added 200 g (0.231 mol) of UNILIN™ 700, 16.7 g (0.231 mol) of acrylic acid, 2 g of methanesulfonic acid and 400 mL of toluene. The resulting mixture was heated to reflux for approximately 15 hours, during which time water had collected in the Dean-Stark apparatus. IR of the reaction product showed no —COOH and —OH peaks, indicating that the ester formation was complete. To the hot ester solution was slowly added 10 g of $Ca(OH)_2$ while stirring. and then hot filtered. The resulting mixture was filtered hot, the toluene was removed from the filtrate by heating under reduced pressure, and the remaining wet solid was dried in a vacuum oven. Also available as X-8503™ from Baker-Petrolite, Tulsa, Okla.

UNILIN™ 425 (also know as polyethylene 460 alcohol from Aldrich Chemical) having about 32 carbon atoms, available from Baker Petrolite Corp.

stearyl alcohol—$C_{18}H_{37}OH$, available from Aldrich Chemical Co., Milwaukee, Wis.

behenyl alcohol—$C_{22}H_{45}OH$, available from Henkel Corp., Emery Group, Cincinnati, Ohio as HENKEL 3302.

MMA—methyl methacrylate, $CH_3OC(O)C(CH_3)=CH_2$, available from Aldrich Chemical Co.

ODA—octadecyl acrylate, $C_{18}H_{37}OC(O)CH=CH_2$, available from Aldrich Chemical Co.

3-mercaptopropionic acid—$HSCH_2CH_2COOH$, available from Aldrich Chemical Co.

methyl 3-mercaptopropionate—$HSCH_2CH_2COOCH_3$, available from Aldrich Chemical Co.

Preparation of Starting Materials $(MeFOSEA)_4(ODA)_1$—S—$CH_2CH_2COOCH_3$—To a round bottom flask equipped with stirrer, thermometer, reflux condenser and nitrogen bubbler was added 122.5 g (0.2 mol) of MeFOSEA monomer, 16.2 g (0.05 mol) of ODA and 150 mL of ethyl acetate. While stirring, nitrogen was bubbled through the resulting solution for 15 minutes. Then to this solution was added 6.0 g (0.05 mol) of methyl 3-mercaptopropionate, and nitrogen was bubbled into the solution for another 2 minutes. 0.5 wt % of AIBN was added and the resulting mixture was heated to 65° C. for about 15 hours under a nitrogen atmosphere. IR spectra of this material showed the absence of >C=C< peak at 1637 cm$^{-1}$, indicating no residual monomer. The reaction product was poured into a 50:50 blend of methyl alcohol and hexanes, and the white powder which precipitated was filtered and dried for about 5–6 hours at 50–60° C. under vacuum. TGA of this material showed onset of thermal degradation in air at 346° C. The calculated average number of polymerized monomer units per polymer chain is 5.

$(MeFOSEMA)_4(ODA)_1$—S—$CH_2CH_2COOCH_3$—This random copolymer was prepared using essentially the same procedure as described for preparing $(MeFOSEA)_4(ODA)_1$—S—$CH_2CH_2COOCH_3$, except that the MeFOSEA was replaced with an equimolar amount of MeFOSEMA. The calculated average number of polymerized monomer units per polymer chain is 5.

$(TELOMER-A)_4(ODA)_1$—S—$CH_2CH_2COOCH_3$—This random copolymer was prepared using essentially the same procedure as described for preparing $(MeFOSEA)_4(ODA)_1$—S—$CH_2CH_2COOCH_3$, except that the MeFOSEA was replaced with an equimolar amount of TELOMER-A. The calculated average number of polymerized monomer units per polymer chain is 5.

$(MeFOSEA)_4(MMA)_1$—S—$CH_2CH_2COOCH_3$—This random copolymer was prepared using essentially the same procedure as described for preparing $(MeFOSEA)_4(ODA)_1$—S—$CH_2CH_2COOCH_3$, except that the ODA was replaced with an equimolar amount of MMA. The calculated average number of polymerized monomer units per polymer chain is 5.

$(MeFOSEA)_4(ODA)_1$—S—$CH_2CH_2COOH$—To a round bottom flask equipped with stirrer, thermometer, reflux condenser and nitrogen bubbler was added 122.5 g (0.2 mol) of MeFOSEA, 16.2 g (0.05 mol) of ODA, and 150 mL of ethyl acetate. The contents of the flask were stirred to form a solution, and nitrogen was bubbled through the solution for 15 minutes. To this solution was then added 5.3 g (0.05 mol) of 3-mercaptopropionic acid, and nitrogen was bubbled through the contents of the flask for an additional 2 minutes. 0.5 wt % of AIBN was added, and the resulting mixture was heated to 65° C. for approximately 15 hours under a nitrogen atmosphere. IR spectra of this material showed the absence of a >C=C< peak at 1637 cm$^{-1}$, indicating the absence of the monomers. The polymer solution was poured in hexanes, causing the polymer to precipitate as a white powder, which was removed by filtration and dried at 50–60° C. under vacuum.

$(MeFOSEA)_4(ODA)_1$—S—$CH_2CH_2COO$-UNILIN™ 700—To a 3-necked round bottom flask equipped with a mechanical stirrer and Dear-Stark apparatus was added 50 g (0.0174 mol) of(MeFOSEA)$_4$(ODA)$_1$—S—CH$_2$CH$_2$COOH, 15 g (0.0174 mol) of UNILIN™ 700 alcohol, 1 mL of methanesulfonic acid and 100 mL of toluene. The resulting mixture was heated to reflux for approximately 15 hours, during which time some water had collected in the Dean-Stark apparatus. IR spectra of this mixture showed no —COOH or —OH peaks. To this hot mixture, 5 g of Ca(OH)$_2$ was slowly added with stirring, and the resulting hot solution was filtered. Toluene was removed from the filtrate by heating under reduced pressure, and the remaining solids were dried in a vacuum oven.

(MeFOSEA)$_4$(ODA)$_1$—S—CH$_2$CH$_2$COO-UNILIN™ 425—This ester was prepared using essentially the same procedure as described for preparing (MeFOSEA)$_4$(ODA)$_1$—S—CH$_2$CH$_2$COO-UILIN™ 700, except that the UNILIN™ 700 Alcohol was replaced with an equimolar amount of UNLIN™ 425 Alcohol.

(MeFOSEA)$_4$(ODA)$_1$—S—CH$_2$CH$_2$COO—C$_{22}$H$_{45}$–This ester was prepared using essentially the same procedure as described for preparing (MeFOSEA)$_4$(ODA)$_1$——CH$_2$CH$_2$COO-UNELIN™ 700, except that the UNILIN™ 700 Alcohol was replaced with an equimolar amount of behenyl alcohol.

(MeFOSEA)$_4$(UNILIN™ 700A)$_1$—SCH$_2$CH$_2$COOCH$_3$—To a round bottom flask equipped with stirrer, thermometer, reflux condenser and nitrogen bubbler was added 122.5 g (0.2 mol) of MeFOSEA monomer, 41.4 g (0.05 mol) of UNILIN™ 700A and 160 mL of methyl isobutyl ketone (MIBK). While stirring at 90° C., nitrogen was bubbled through the resulting solution for 15 minutes. Then to this solution was added 6.0 g (0.05 mol) of methyl 3-mercaptopropionate, and nitrogen was bubbled into the solution for another 2 minutes. 0.8% (wt) of VAZOT 88 was added and the resulting mixture was heated to 95–100° C. for about 24 hours under a nitrogen atmosphere. IR spectra of this material showed the absence of >C=C< peak at 1637 cm$^{-1}$, indicating no residual monomer. The MIBK was evaporated under reduced pressure. The calculated average number of polymerized monomer units per polymer chain is 5.

(MeFOSEA)$_4$(UNILIN™ 700A)$_1$—S—CH$_2$CH$_2$COOCH$_3$—This random copolymer was prepared using essentially the same procedure as described for preparing (MeFOSEA)$_4$(UNIIN™ 700A)$_1$—S—CH$_2$CH$_2$COOCH$_3$, except that the MeFOSEA was replaced with an equimolar amount of MeFBSEA. The calculated average number of polymerized monomer units per polymer chain is 5.

(MeFOSEA)$_4$(UNILIN™ 700A)$_1$—S—C$_{18}$H$_{37}$—To a round bottom flask equipped with stirrer, thermometer, reflux condenser and nitrogen bubbler was added 122.5 g (0.2 mol) of MeFOSEA, 41.4 g (0.05 mol) of UNLIN™ 700A and 150 mL of methyl isobutyl ketone. While stirring, nitrogen was bubbled through the resulting solution for 15 minutes. Then to this solution was added 14.3 g (0.05 mol) of octadecyl mercaptan, and nitrogen was bubbled into the solution for an additional 2 minutes. 0.5% (wt) of VASO™ 88 was added and the resulting mixture was heated to 65° C. for about 15 hours under a nitrogen atmosphere. IR spectra of this material showed the absence of >C=C< peak at 1637 cm$^{-1}$, indicating no residual monomer. The reaction product was poured into a 50:50 blend of methyl alcohol and hexanes, and the white powder which precipitated was filtered and dried for about 5–6 hours at 50–60° C. under vacuum. The calculated average number of polymerized monomer units per polymer chain is 5.

Examples of Polish Compositions

Comparative Example A

Liquid Wax

The liquid wax control is a modified formulation taken from Dow Corning's *Automotive Car Formulation Guide* form no. 25-653-94, formulation APF 310. (Dow Corning Corporation, Midland, Mich.). 60.00 grams of water were mixed with 10.00 grams of Kaopolite™ SF (Kaopolite, Inc., Union, N.J.). To the stirred mixture, 1.00 gram of Witcamide™ 511 (Witco Corporation, Houston, Tex.), and 21.50 grams of Stoddard solvent was added. Once uniform, 6.00 grams of Dow Corning™ 531 Fluid and 1.00 gram of Dow Corning™ 536 Fluid was added (both from Dow Corning Corporation, Midland, Mich.), followed by 0.50 grams of Bentone™ 38 (Rheox Corporation, Highstown, N.J.) and the mixture was stirred until uniform.

Comparative Example B

Paste Wax

The paste wax control is a modified formulation taken from Dow Corning's *Automotive Car Formulation Guide* form no. 25-652-94, formulation APF 210. (Dow Corning Corporation, Midland, Mich.). 8.00 grams of Dow Corning 200™ silicone fluid, 350 cs. (Dow Corning Corporation, Midland, Mich.) and 10 grams each of PETRANAUBA™ C Oxidized Wax and PETROLITE™ P-25 Wax (both from the Baker Petrolite Corporation, Tulsa, Okla.) were melted in a flask at 215° F. In a separate flask 18.00 grams of Stoddard solvent and 54.00 grams of odorless mineral spirits were preheated to 75° F. The preheated solvent was added to the melted wax/solvent mixture with stirring until uniform and allowed to cool.

Liquid Polish Composition Containing Oligomers: Compositions 1–10

Compositions 1–10 were made by first dissolving the oligomer in Stoddard solvent at 140° F. In a separate flask, the Dow Corning™ silicone fluids, Witcamide™ 511, water, and abrasive were combined in the amounts shown in Table 1 (below) and stirred with high shear. The hot solvent/oligomer mixture was then added under high shear to the abrasive slurry and the emulsion allowed to cool to room temperature. The Bentone™ 38 was then added to reach the desired viscosity (10,000–15,000 cps). The amounts of each ingredient for Examples 1–10 and Comparative Example A are shown in Table 1.

Paste Polish Compositions Containing Oligomers: Compositions 11–20

Compositions 11–20 were made by first dissolving the oligomer in 8.00 grams of Dow Corning 200™ silicone fluid, 350 cs. (Dow Corning Corporation, Midland, Mich.) and 10 grams each of PETRANAUBA™ C Oxidized Wax and PETROLITE™ P-25 Wax (both from the Baker Petrolite Corporation, Tulsa, Okla.) in a flask at 215° F. In a separate flask, Stoddard solvent and odorless mineral spirits are preheated to 75° F. (See Table 1 for amounts). The preheated solvent is then added to the melted wax/solvent mixture with stirring. The solution is then stirred until uniform and allowed to cool. The amounts of each ingredient for Examples 11–20 and Comparative Example B are shown in Table 1.

In Tables 1 and 2, all values are in parts by weight.

TABLE 1

| Example Number | 1 | 2 | 3 | 4 | 5 | 6 | 7 | 8 | 9 | 10 | Control A |
|---|---|---|---|---|---|---|---|---|---|---|---|
| Stoddard | 22.00 | 22.00 | 22.00 | 22.00 | 22.00 | 22.00 | 22.00 | 22.00 | 22.00 | 22.00 | 21.50 |
| Dow Corning ™ 531 | 6.00 | 6.00 | 6.00 | 6.00 | 6.00 | 6.00 | 6.00 | 6.00 | 6.00 | 6.00 | 6.00 |
| Dow Corning ™ 536 | 1.00 | 1.00 | 1.00 | 1.00 | 1.00 | 1.00 | 1.00 | 1.00 | 1.00 | 1.00 | 1.00 |
| Witcamide ™ 511 | 2.00 | 2.00 | 2.00 | 2.00 | 2.00 | 2.00 | 1.00 | 2.00 | 2.00 | 2.00 | 1.00 |
| DI Water | 50.80 | 53.00 | 53.00 | 53.00 | 53.00 | 53.00 | 53.00 | 53.00 | 53.00 | 53.00 | 53.00 |
| Kaopolite ™ SF | 10.00 | 10.00 | 10.00 | 10.00 | 10.00 | 10.00 | 10.00 | 10.00 | 10.00 | 10.00 | 10.00 |
| Bentone ™ 38 | 0.88 | 0.88 | 0.88 | 0.88 | 0.88 | 0.88 | 0.88 | 0.88 | 0.88 | 0.88 | 0.50 |
| $(MeFBSEA)_4(UNILIN\ ™\ 700A)_1$-S-$CH_2CH_2COOCH_3$ | 4.40 | 0.00 | 0.00 | 0.00 | 0.00 | 0.00 | 0.00 | 0.00 | 0.00 | 0.00 | 0.00 |
| $(MeFOSEMA)_4(ODA)_1$-S-$CH_2CH_2COOCH_3$ | 0.00 | 2.20 | 0.00 | 0.00 | 0.00 | 0.00 | 0.00 | 0.00 | 0.00 | 0.00 | 0.00 |
| $(MeFOSEA)_4(MMA)_1$-S-$CH_2CH_2COOCH_3$ | 0.00 | 0.00 | 2.20 | 0.00 | 0.00 | 0.00 | 0.00 | 0.00 | 0.00 | 0.00 | 0.00 |
| $(MeFOSEA)_4(ODA)_1$-S-$CH_2CH_2COO$-UNILIN ™ 425 | 0.00 | 0.00 | 0.00 | 2.20 | 0.00 | 0.00 | 0.00 | 0.00 | 0.00 | 0.00 | 0.00 |
| $(TELOMER)_4(ODA)_1$-S-$CH_2CH_2COOCH_3$ | 0.00 | 0.00 | 0.00 | 0.00 | 2.20 | 0.00 | 0.00 | 0.00 | 0.00 | 0.00 | 0.00 |
| $(MeFOSEA)_4(UNILIN\ ™\ 700A)_1$-S-$C_{18}H_{37}$ | 0.00 | 0.00 | 0.00 | 0.00 | 0.00 | 2.20 | 0.00 | 0.00 | 0.00 | 0.00 | 0.00 |
| $(MeFOSEA)_4(ODA)_1$-S-$CH_2CH_2COOCH_3$ | 0.00 | 0.00 | 0.00 | 0.00 | 0.00 | 0.00 | 2.20 | 0.00 | 0.00 | 0.00 | 0.00 |
| $(MeFOSEA)_4(ODA)_1$-S-$CH_2CH_2COOC_{22}H_{45}$ | 0.00 | 0.00 | 0.00 | 0.00 | 0.00 | 0.00 | 0.00 | 2.20 | 0.00 | 0.00 | 0.00 |
| $(MeFOSEA)_4(UNILIN\ ™\ 700A)_1$-S-$CH_2CH_2COOCH_3$ | 0.00 | 0.00 | 0.00 | 0.00 | 0.00 | 0.00 | 0.00 | 0.00 | 2.20 | 0.00 | 0.00 |
| $(MeFOSEA)_4(ODA)_1$-S-$CH_2CH_2COO$-UNILIN ™ 700 | 0.00 | 0.00 | 0.00 | 0.00 | 0.00 | 0.00 | 0.00 | 0.00 | 0.00 | 2.20 | 0.00 |

TABLE 2

| Example Number | 11 | 12 | 13 | 14 | 15 | 16 | 17 | 18 | 19 | 20 | Control B |
|---|---|---|---|---|---|---|---|---|---|---|---|
| 200 Fluid Dow Corning, 350 cs | 8.00 | 8.00 | 8.00 | 8.00 | 8.00 | 8.00 | 8.00 | 8.00 | 8.00 | 8.00 | 8.00 |
| Petranauba C Oxidized Wax | 10.00 | 10.00 | 10.00 | 10.00 | 10.00 | 10.00 | 10.00 | 10.00 | 10.00 | 10.00 | 10.00 |
| Petrolite P-25 Wax | 10.00 | 10.00 | 10.00 | 10.00 | 10.00 | 10.00 | 10.00 | 10.00 | 10.00 | 10.00 | 10.00 |
| Stoddard solvent | 18.00 | 18.00 | 18.00 | 18.00 | 18.00 | 18.00 | 18.00 | 18.00 | 18.00 | 18.00 | 18.00 |
| Odorless Mineral Spirits | 49.60 | 51.80 | 51.80 | 51.80 | 51.80 | 51.80 | 51.80 | 51.80 | 51.80 | 51.80 | 54.00 |
| $(MeFBSEA)_4(UNILIN\ ™\ 700A)_1$-S-$CH_2CH_2COOCH_3$ | 4.40 | 0.00 | 0.00 | 0.00 | 0.00 | 0.00 | 0.00 | 0.00 | 0.00 | 0.00 | 0.00 |
| $(MeFOSEMA)_4(ODA)_1$-S-$CH_2CH_2COOCH_3$ | 0.00 | 2.20 | 0.00 | 0.00 | 0.00 | 0.00 | 0.00 | 0.00 | 0.00 | 0.00 | 0.00 |
| $(MeFOSEA)_4(MMA)_1$-S-$CH_2CH_2COOCH_3$ | 0.00 | 0.00 | 2.20 | 0.00 | 0.00 | 0.00 | 0.00 | 0.00 | 0.00 | 0.00 | 0.00 |
| $(MeFOSEA)_4(ODA)_1$-S-$CH_2CH_2COO$-UNILIN ™ 425 | 0.00 | 0.00 | 0.00 | 2.20 | 0.00 | 0.00 | 0.00 | 0.00 | 0.00 | 0.00 | 0.00 |
| $(TELOMER)_4(ODA)_1$-S-$CH_2CH_2COOCH_3$ | 0.00 | 0.00 | 0.00 | 0.00 | 2.20 | 0.00 | 0.00 | 0.00 | 0.00 | 0.00 | 0.00 |
| $(MeFOSEA)_4(UNILIN\ ™\ 700A)_1$-S-$C_{18}H_{37}$ | 0.00 | 0.00 | 0.00 | 0.00 | 0.00 | 2.20 | 0.00 | 0.00 | 0.00 | 0.00 | 0.00 |
| $(MeFOSEA)_4(ODA)_1$-S-$CH_2CH_2COOCH_3$ | 0.00 | 0.00 | 0.00 | 0.00 | 0.00 | 0.00 | 2.20 | 0.00 | 0.00 | 0.00 | 0.00 |
| $(MeFOSEA)_4(ODA)_1$-S-$CH_2CH_2COOC_{22}H_{45}$ | 0.00 | 0.00 | 0.00 | 0.00 | 0.00 | 0.00 | 0.00 | 2.20 | 0.00 | 0.00 | 0.00 |
| $(MeFOSEA)_4(UNILIN\ ™\ 700A)_1$-S-$CH_2CH_2COOCH_3$ | 0.00 | 0.00 | 0.00 | 0.00 | 0.00 | 0.00 | 0.00 | 0.00 | 2.20 | 0.00 | 0.00 |
| $(MeFOSEA)_4(ODA)_1$-S-$CH_2CH_2COO$-UNILIN ™ 700 | 0.00 | 0.00 | 0.00 | 0.00 | 0.00 | 0.00 | 0.00 | 0.00 | 0.00 | 2.20 | 0.00 |

Ease of Removal Testing

Examples 1–20 and Comparative Examples A and B were then tested for ease of removal. 0.5 grams of wax was coated on to an ACT Black OEM clear coated panel # AIN78436 obtained from ACT Laboratories, Inc. of Hillside, Mich. and allowed to haze (evaporate slowly) until complete solvent evaporation. The panel was then wiped using a BYK-Gardener abrasion tester equipped with a clean paper towel. The number of complete cycles needed for removal of the wax film was recorded.

TABLE 3

| Example Number | Cycles | Comments |
|---|---|---|
| 1 | 5 | Still had residue remaining |
| 2 | 5 | Still had residue remaining |
| 3 | 1 | Very easy, complete removal of wax |
| 4 | 1 | Very easy, complete removal of wax |
| 5 | 1 | Very easy, complete removal of wax |
| 6 | 4 | Still had residue remaining |
| 7 | 4 | Still had residue remaining |
| 8 | 1 | Very easy, complete removal of wax. |
| 9 | 3 | Fairly complete, some residue remaining. |
| 10 | 3 | Fairly complete, some residue remaining. |
| 11 | 4 | Fairly complete, some residue remaining. |
| 12 | 5 | Still had residue remaining |
| 13 | 1 | Very easy, complete removal of wax |
| 14 | 1 | Very easy, complete removal of wax |
| 15 | 1 | Very easy, complete removal of wax |
| 16 | 3 | Fairly complete, some residue remaining. |
| 17 | 3 | Fairly complete, some residue remaining. |
| 18 | 1 | Very easy, complete removal of wax |
| 19 | 3 | Fairly complete, some residue remaining. |
| 20 | 3 | Fairly complete, some residue remaining. |
| Control A Liquid wax | 7 | Difficult to remove in comparison, still had residual. |
| Control B Paste Wax | 4 | Fairly complete, some residue remaining. |

Durability testing: Examples 1–20 and Comparative Examples A and B

The durability of the Examples 1–20 and Comparative Examples A and B were then tested. Ten grams of the polish composition was applied to ACT OEM black panel # AIN78436 and allowed to haze (evaporate slowly) until complete solvent evaporation. The material was tested for removal by hand using a soft cloth and the panel placed in a 120 F oven for 24 hrs. The panels were abraded in 500 cycle intervals with a ScotchBrite™ "T" type pad with a five pound weight using 50 grams of a concentrated (50:1) solution of 3M™ Car Wash Soap as a lubricant on a BYK-Gardener Abrasion Tester. Static contact angles were measured at three locations on each of the waxed panels using a VCA-2000™ Video Contact Angle System for Surface Analysis, available from Advance Surface Technology Inc., Billerica, Mass. An eight microliter drop of deionized water was metered onto the waxed panel surface using a syringe. A five point curve fitting algorithm was used to calculate the contact angles of the water droplet on the waxed panel surface. The decline in the contact angle was used to determine the existence of the coating. As the coating wears off, the contact angle will diminish. Samples of Control A and B were subjected to the same tests and used as comparative examples.

All the panels were also abraded in 500 cycle intervals on a BYK-Gardener Abrasion Tester. The contact angle was measured every 500 cycles and recorded as in the procedure above. The results of the test are recorded in the Table 3 as degrees.

TABLE 4

| Cycles/Examples | 0 | 500 | 1000 | 1500 | 2000 |
|---|---|---|---|---|---|
| 1 | 93 | 89 | 73 | 72 | 71 |
| 2 | 92 | 85 | 76 | 73 | 78 |
| 3 | 104 | 94 | 79 | 77 | 77 |
| 4 | 103 | 92 | 79 | 78 | 69 |
| 5 | 100 | 95 | 83 | 81 | 80 |
| 6 | 102 | 75 | 74 | 75 | 70 |

TABLE 4-continued

| Cycles/Examples | 0 | 500 | 1000 | 1500 | 2000 |
|---|---|---|---|---|---|
| 7 | 104 | 73 | 72 | 71 | 68 |
| 8 | 106 | 83 | 78 | 77 | 73 |
| 9 | 105 | 93 | 86 | 83 | 82 |
| 10 | 101 | 90 | 86 | 83 | 79 |
| 11 | 98 | 90 | 78 | 72 | 71 |
| 12 | 95 | 90 | 85 | 73 | 70 |
| 13 | 108 | 99 | 85 | 84 | 75 |
| 14 | 107 | 100 | 82 | 75 | 71 |
| 15 | 106 | 100 | 95 | 88 | 85 |
| 16 | 105 | 89 | 79 | 75 | 68 |
| 17 | 106 | 81 | 74 | 71 | 68 |
| 18 | 104 | 87 | 77 | 75 | 71 |
| 19 | 109 | 98 | 90 | 85 | 84 |
| 20 | 103 | 99 | 94 | 90 | 85 |
| Control A | 95 | 84 | 75 | 73 | 71 |
| Control B | 102 | 91 | 81 | 79 | 74 |

What is claimed is:

1. A polish composition comprising:
   a base component selected from the group consisting of waxes, silicone oils and mixtures thereof; and an alkylated fluorochemical oligomeric compound comprising:
   (i) a fluorochemical oligomer comprising an aliphatic backbone with a plurality of fluoroaliphatic and fluorine-free aliphatic groups attached thereto, each of pendent fluoroaliphatic and fluorine-free aliphatic pendent groups independently linked to a carbon atom of the aliphatic backbone through organic linking groups;
   (ii) an aliphatic moiety, and
   (iii) a linking group which links the fluorochemical oligomeric portion to the aliphatic moiety.

2. The polish composition of claim 1, wherein the alkylated fluorochemical oligomer has the general formulas selected from the group consisting of:
   $[(A)_m\text{-}L]_n A$ and $(A)_m[L\text{-}R]_m$,
   wherein m is 1 or 2,
   n is a whole number from 1 to about 10;
   each L independently comprises a linking group;
   R is an organic aliphatic moiety; and
   A is a fluorochemical oligomer of the formula;

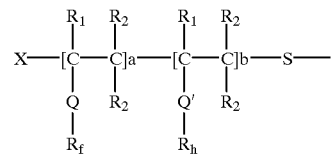

wherein the sum of a+b is an number such that A is oligomeric and comprises a plurality of pendent $R_f$ and $R_h$ groups;
   $R_1$ is hydrogen, halogen, or straight chain or branched chain alkyl containing 1 to about 4 carbon atoms;
   each $R_2$ is independently hydrogen or straight chain or branched chain alkyl containing 1 to about 4 carbon atoms;
   each Q and Q' is a covalent bond or an organic linking group;
   $R_f$ is a fluoroaliphatic group, that comprises a fully fluorinated terminal group;
   $R_h$ is a fluorine-free aliphatic group; and X is a hydrogen atom or a group derived from a free radical initiator.

3. The polish composition of claim 2 wherein the ratio of a:b is 4:1 or more.

4. The polish composition of claim 2 wherein $R_f$ has the structure $C_oF_{2o+1}$, where o is 4 to 14.

5. The polish composition of claim 2 wherein L is selected from the group consisting of a covalent bond, straight chain, branched chain, or cyclic alkylene, arylene, aralkylene, oxy, oxo, hydroxy, thio, sulfonyl, sulfoxy, amino, imino, sulfonamido, carboxamido, carbonyloxy, urethanylene, ureylene, and combinations thereof.

6. The polish composition of claim 1, wherein the base component comprises a wax selected from the group consisting of carnauba, montan, paraffin, microcrystalline, beeswax, candellia, and mixtures thereof.

7. The polish composition of claim 1, wherein the base component comprises an alkoxylated wax comprising one or more free alcohol groups, a free acid groups, or olefinic groups that have been reacted with alkylene oxide to attach a poly(alkoxy) group at the free alcohol, the free acid, or the olefinic groups.

8. The polish composition of claim 7, wherein the wax component is prepared by reacting natural carnauba wax with alkylene oxide.

9. The polish composition of claim 8, wherein the alkylene oxide comprises one or more of ethylene oxide and propylene oxide.

10. The polish composition of claim 7, wherein the alkoxylated wax is prepared by reacting 100 parts by weight of natural carnauba wax with about 25 parts by weight of a mixture of ethylene oxide and propylene oxide, the ethylene oxide and propylene oxide being present in a weight ratio in the range from 90:10 to 99:1.

11. The polish composition of claim 1, comprising:
from about 1 to 15 pans by weight alkylated fluorochemical oligomer;
from about 5 to 42 parts by weight base component; and
from about 40 to 80 parts by weight solvent.

12. The polish composition of claim 11 wherein said base component is a wax.

13. The polish composition of claim 11 wherein said base component is a silicone oil.

14. The polish composition of claim 12, wherein the 5 to 42 parts by weight base component comprises from about 30 to 90 weight percent alkoxylated wax.

15. The polish composition of claim 5 wherein L is chosen from the group consisting of a covalent bond, —$CH_2)_kO(O)C$—, —$CH_2CH(OR_2')C_2C(O)O$—, —$(CH_2)_kC(O)O$—, —$(CH_2)_kO$—, —$(CH_2)_kO(CH_2)_kO(O)C$—, and —$(CH2)_kOCONH$—, wherein each k is independently an integer from 0 to about 20, $R_1'$ is hydrogen, phenyl, or alkyl of 1 to about 4 carbon atoms, and $R_2'$ is alkyl of 1 to about 20 carbon atoms.

16. A method of protecting a substrate from environmental damage, the method comprising the steps of:
providing a substrate having a surface;
coating said surface with a polish composition comprising:
a base component selected from the group consisting of waxes, silicone oils and mixtures thereof; and
an alkylated fluorochemical oligomer comprising:
(i) a fluorochemical oligomer comprising an aliphatic backbone with a plurality of fluoroaliphatic and fluorine-free aliphatic groups attached thereto, each of pendent fluoroaliphatic and fluorine-free aliphatic pendent groups independently linked to a carbon atom of the aliphatic backbone through organic linking groups;
(ii) an aliphatic moiety; and
(iii) a linking group which links the fluorochemical oligomeric portion to the aliphatic moiety.

17. The method of claim 15, wherein the alkylated fluorochemical oligomer has the general formula selected from the group consisting of:
$[(A)_m\text{-L}]_nR$ and $(A)_m[L\text{-R}]_n$,
wherein m is 1 or 2,
n is a whole number from 1 to about 10;
each L independently comprises a linking group;
R is an organic aliphatic moiety; and
A is a fluorochemical oligomeric portion of the formula:

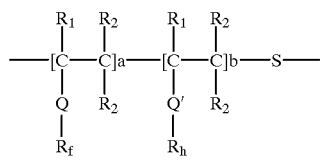

wherein the sum of a+b is an number such that A is oligomeric and comprises a plurality of pendent $R_f$ and $R_h$ groups;
$R_1$ is hydrogen, halogen, or straight chain or branched chain alkyl containing 1 to about 4 carbon atoms;
each $R_2$ is independently hydrogen or straight chain or branched chain alkyl containing 1 to about 4 carbon atoms;
each Q and Q' is a covalent bond or an organic linking group;
$R_r$ is a fluoroalipliatic group that comprises a fully fluorinated terminal group;
$R_h$ is a fluorine-free aliphatic group; and
X is a hydrogen atom or a group derived from a free radical initiator.

* * * * *

UNITED STATES PATENT AND TRADEMARK OFFICE
CERTIFICATE OF CORRECTION

PATENT NO.   : 6,193,791 B1                                       Page 1 of 2
DATED        : February 27, 2001
INVENTOR(S)  : Vander Louw and Steven J.

It is certified that error appears in the above-identified patent and that said Letters Patent is hereby corrected as shown below:

Column 4,
Line 30, delete the structure beginning with "—[C—C]a—[C—C]b—S—" and insert in place thereof the structure beginning with "X—[C—C]a—[C—C]b—S—" (with substituents $R_1$, $R_2$, $Q$, $Q'$, $R_f$, $R_h$).

Column 9,
Line 16, delete "sulfhlydryl" and insert in place thereof -- sulfhydryl --.

Column 10,
Line 48, delete "FREONT$^{TM}$" and insert in place thereof -- FREON$^{TM}$113 --.

Column 11,
Line 59, after the word "thereof" insert -- . --.

Column 15,
Lines 37 and 40, delete "$C_8F_{17}SO_2N(CH_3)C_2HOC(O)CH=CH_2$" and insert in place thereof -- $C_8F_{17}SO_2N(CH_3)C_2H_4OC(O)CH=CH_2$ --.

Column 17,
Line 18, delete "UNLIN$^{TM}$" and insert in place thereof -- UNILIN$^{TM}$ --.
Lines 21-22, delete "(MeFOSEA)$_4$(ODA)$_1$-CH$_2$ CH$_2$COO-UNELIN$^{TM}$" and insert in place thereof -- (MeFOSEA)$_4$(ODA)$_1$-S-CH$_2$ CH$_2$COO-UNILIN$^{TM}$ --.
Line 34, delete "VAZOT 88" and insert in place thereof -- VAZO$^{TM}$ 88 --.
Line 43, delete "(MeFOSEA)$_4$(UNILIN$^{TM}$700A)$_1$-S-CH$_2$CH$_2$COOCH$_3$" and insert in place thereof -- (MeFBEA)$_4$(UNILIN$^{TM}$700A)$_1$-S-CH$_2$CH$_2$COOCH$_3$ --.
Line 46, delete "(MeFOSEA)$_4$(UNIIN$^{TM}$700A)$_1$-S-CH$_2$CH$_2$COOCH$_3$" and insert in place thereof -- (MeFOSEA)$_4$(UNILIN$^{TM}$700A)$_1$-S-CH$_2$CH$_2$COOCH$_3$ --.
Line 53, delete "UNLIN$^{TM}$ 700A" and insert in place thereof -- UNILIN$^{TM}$ 700A --.

Column 22,
Line 39, delete "$[(A)_m–L]_nA$ and $(A)_m[L–R]_m$," and insert in place thereof -- $[(A)_m–L]_nR$ and $(A)_m[L–R]_n$, --.

Column 23,
Line 30, delete "alkoxylatod" and insert in place thereof -- alkoxylated --.
Line 36, delete "pans" and insert in place thereof -- parts --.

UNITED STATES PATENT AND TRADEMARK OFFICE
CERTIFICATE OF CORRECTION

PATENT NO.    : 6,193,791 B1
DATED         : February 27, 2001
INVENTOR(S)   : Vander Louw and Steven J.

It is certified that error appears in the above-identified patent and that said Letters Patent is hereby corrected as shown below:

Column 24,
Line 29, delete "claim 15" and insert in place thereof -- claim 16 --.
Line 30, delete 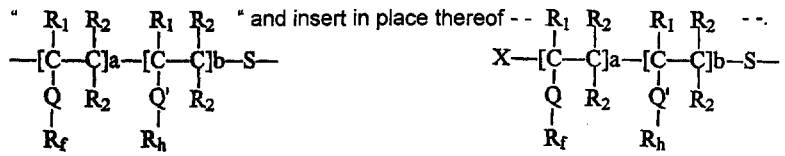

Line 41, delete "$R_r$" and insert in place thereof -- $R_f$ --.

Signed and Sealed this

Twenty-first Day of January, 2003

JAMES E. ROGAN
*Director of the United States Patent and Trademark Office*